United States Patent [19]

Choi

[11] Patent Number: 5,502,487
[45] Date of Patent: Mar. 26, 1996

[54] CHARACTER SIGNAL DISPLAY FOR A CAMCORDER USING EXISTENT SYNCHRONIZATION SIGNALS FOR CHARACTER DISPLAY

[75] Inventor: Sung-gyu Choi, Suwon, Rep. of Korea

[73] Assignee: Samsung Electronics Co., Ltd., Kyungki-do, Rep. of Korea

[21] Appl. No.: 283,805

[22] Filed: Aug. 1, 1994

[30] Foreign Application Priority Data

Jul. 31, 1993 [KR] Rep. of Korea ............... 1993-14810
Jul. 19, 1994 [KR] Rep. of Korea ............... 94-17905

[51] Int. Cl.⁶ ........................................ H04N 5/262
[52] U.S. Cl. ................... 348/239; 348/222; 358/909.1
[58] Field of Search ........................ 348/239, 222, 348/333, 569, 589, 600; 358/909.1, 906; H04N 5/262, 9/74, 9/76

[56] References Cited

U.S. PATENT DOCUMENTS

4,325,080  4/1982  Satoh .................. 358/224
4,706,075  11/1987 Hattori ................. 340/726
5,162,915  11/1992 Idera .................. 348/239

Primary Examiner—James J. Groody
Assistant Examiner—Sherrie Hsia
Attorney, Agent, or Firm—Sughrue, Mion, Zinn, Macpeak & Seas

[57] ABSTRACT

A character signal display for a camcorder includes a character signal generator for providing needed character data responsive to horizontal and vertical sync signals separated from a selected video signal. According to one aspect of the invention, the vertical sync signal is extracted from the selected video signal by a microcomputer while the horizontal sync signal is extracted from the selected video signal using a Hsync signal oscillator associated with an electronic viewfinder. When an external video signal is input, selection between the external video signal and the camera video signal is arbitrary; when the external video signal is not applied, the camera video signal is preferentially selected. According to another aspect of the invention, circuitry associated with the electronic viewfinder can generate both the horizontal and vertical sync signals needed by the character generator. Therefore, the conventional synchronous signal generator and synchronous signal separator can be omitted from the camcorder. As a result, the manufacturing cost can be curtailed while still providing the desired synchronous signals.

14 Claims, 8 Drawing Sheets

CHARACTER SIGNAL DISPLAY FOR A CAMCORDER USING EXISTENT SYNCHRONIZATION SIGNALS FOR CHARACTER DISPLAY

BACKGROUND OF THE INVENTION

1. Field of the Invention

The present invention relates to a character signal display for a camcorder, and more particularly, to a character signal display that utilizes a synchronous signal supplied by a camera and a viewfinder as a synchronous signal for displaying a character signal, when no external video signal is input.

Korean Patent Application Nos. 93-14810 and 94-17905 are incorporated herein by reference for all purposes.

2. Discussion of Related Art

Generally speaking, a user can confirm the operational status of equipment in use by displaying characters on a display device such as a monitor or an electronic viewfinder. The user can also select a desired function using the displayed characters. The function whereby characters are displayed on the screen of a display device is called an on-screen display (OSD) function. The OSD function is widely applied to such devices as televisions and camcorders for displaying images. It will be noted that vertical and horizontal synchronous signals are employed to permit display of OSD character data onto an exact location of a screen. The vertical and horizontal locations of the character data on the screen are determined by the vertical and horizontal synchronous signals.

Figure 1:
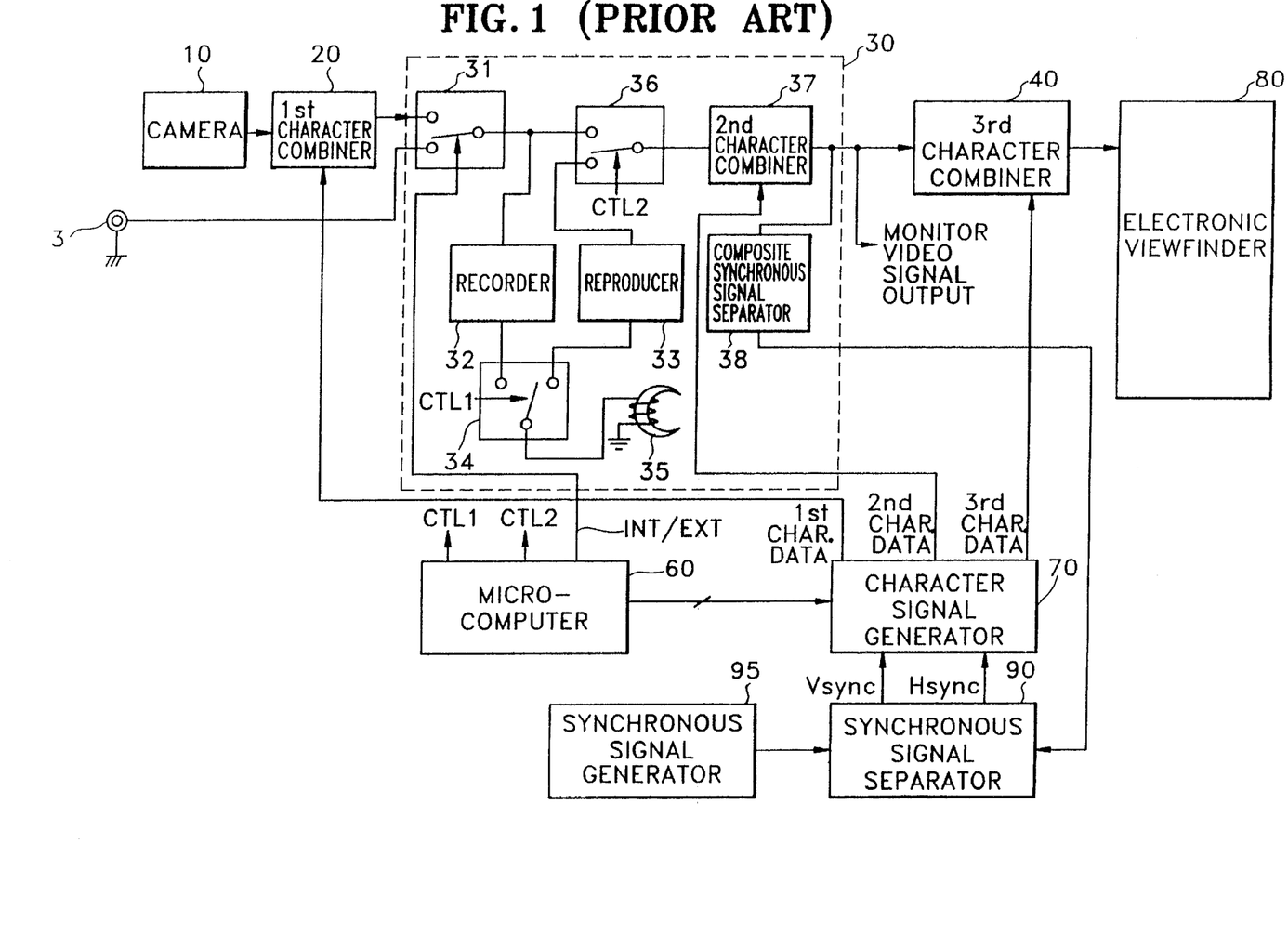
FIG. 1 is a block diagram showing a conventional character signal display of the camcorder.

FIG. 1 is a block diagram showing a conventional camcorder character signal display which performs the above-mentioned OSD function.

In FIG. 1, a camera 10 is connected to a first character combiner 20 which is connected to a first input terminal of a selector 31 of a recorder/reproducer unit 30. An external video signal input terminal 3 is connected to a second input terminal of selector 31. Recorder/reproducer unit 30 includes a selector 31, a recorder 32 connected to the output terminal of selector 31, a reproducer 33, a first control switch 34 having a first select contact connected to the output of recorder 32 and a second select contact connected to the input of reproducer 33 and whose output terminal is connected to a head 35, a second control switch 36 having a first select contact connected to the output terminal of selector 31 and a second select contact connected to the output of reproducer 33, a second character combiner 37 connected to the output terminal of second control switch 36, and a composite synchronous signal separator 38 connected to the output of second character combiner 37. A third character combiner 40 is connected between second character combiner 37 and an electronic viewfinder 80.

A microcomputer 60 is connected to each control terminal of selector 31 and first and second control switches 34 and 36. Microcomputer 60 is also connected to input terminal of a character signal generator 70. First, second and third outputs of character signal generator 70 are connected to first, second and third character combiners 20, 37 and 40, respectively. Character signal generator 70 receives vertical and horizontal synchronous signals from a synchronous signal separator 90. One input of synchronous signal separator 90 is connected to the output of composite synchronous signal separator 38, while another input is connected to the output of a synchronous signal generator 95.

The camcorder character signal display constructed as described above can be roughly divided into a camera (10), a VCR and electronic viewfinder (80). The recorder/reproducer unit 30, third character combiner 40, microcomputer 60 and character signal generator 70 belong to the VCR.

Figure 2:
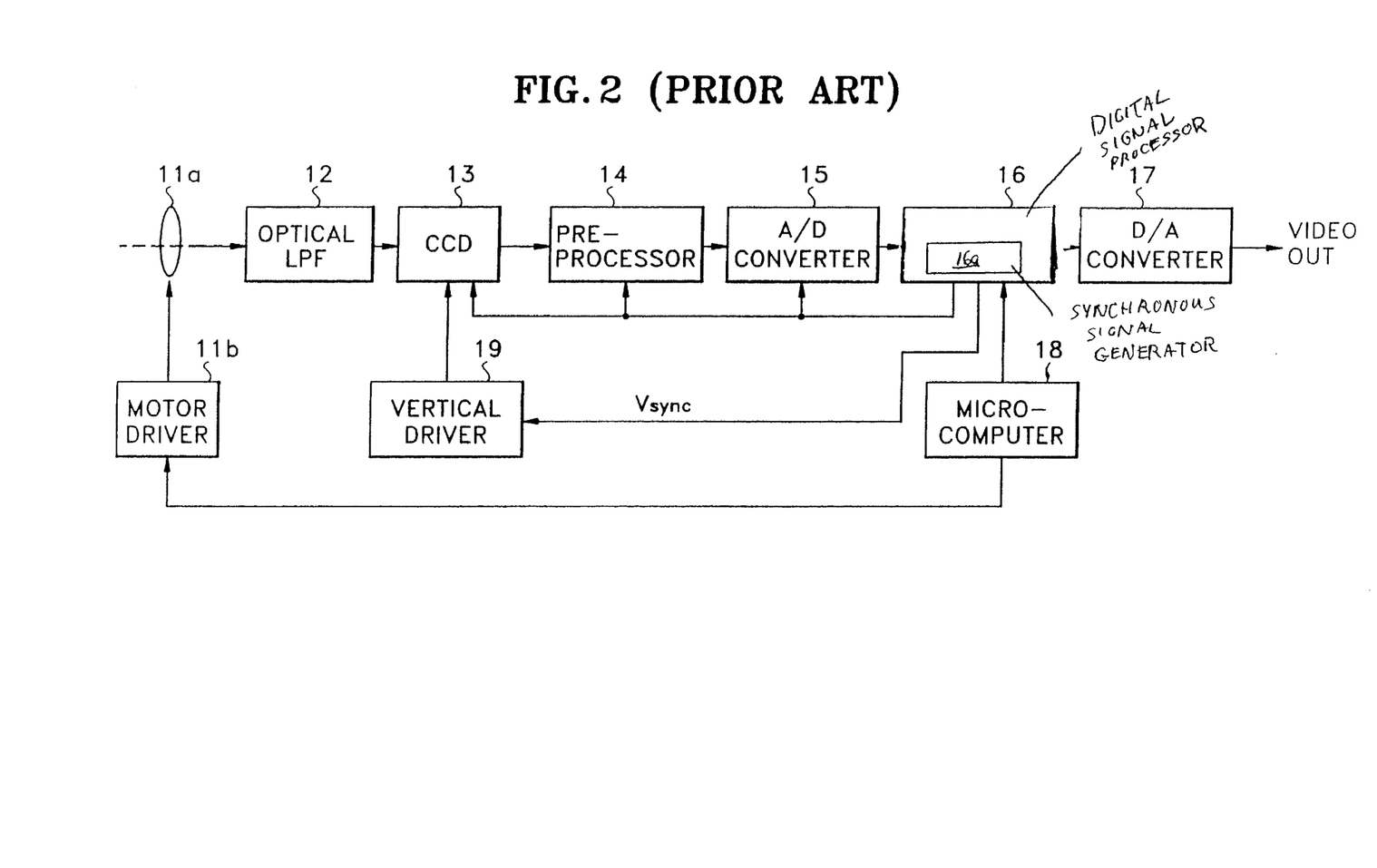
FIG. 2 is a detailed block diagram of the camera shown in FIG. 1.

A detailed constitution of camera 10, which permits conversion of optical information into an electrical video signal input to first character combiner 20, is shown in FIG. 2, wherein object information input via a lens 11 a is converted into an electrical video signal in a charge-coupled device (CCD) 13 through an optical low-pass filter (LPF) 12. LPF 12 prevents interference among the pixels of CCD 13. In a preprocessor 14, the output of CCD 13 is correlated-double-sampled and automatically gain-controlled. Gamma correction is also performed in preprocessor 14 so as to correct the color component of the video signal with respect to the gain-controlled output. In an analog-to-digital (A/D) converter 15, the output of preprocessor 14 is converted into a digital signal. Then, a digital signal processor (DSP) 16, including a synchronous signal generator 16a which generates a synchronous signal. The video signal output from A/D converter 15, separates the received signal into luminance and chrominance signals for processing. Thereafter, the processed video signal and the generated synchronous signal are combined to form a composite video signal, which is output via a digital-to-analog (D/A) converter 17. In addition, DSP 16 has a timing generator so that the timing of CCD 13, preprocessor 14 and A/D converter 15 can be controlled and so that a vertical driver 19 for driving CCD 13 can be properly controlled by the generated vertical synchronous signal (Vsync).

It will be appreciated that DSP 16 and motor driver 11b are controlled by microcomputer 18. It will also be appreciated that, while microcomputers 18 and 60 are separate elements, a single microcomputer providing all processing functions can be employed.

Accordingly, the output of camera 10 shown in FIG. 1 is a composite video signal in which an image signal and synchronous signals are combined. In first character combiner 20, first character data output from character signal generator 70 is combined with the composite video signal. Here, the first character data is used during recording. For example, the character data may indicate various recording conditions (e.g., filming date, location, subject) which can be used, after editing. Thus, a user can recognize specific recording conditions using the first character data.

The output signal of first character combiner 20 (called the camera video signal) is input to the first input terminal of selector 31, while an external video signal is input to its second input terminal via external video signal input terminal 3. The external video signal source may be a video cassette recorder, another camcorder or a television.

Selector 31 permits selection of either the external video signal or the camera video signal according to an internal/external input select signal (int/ext) output from microcomputer 60. The selected signal is applied to recorder 32 and the first select contact of second control switch 36. In addition, according to a record/reproduction mode control signal CTL1 output from microcomputer 60, first control switch 34 controls whether the output signal of recorder 32 is recorded via head 35 or the signal reproduced by head 35 is provided to reproducer 33. In second control switch 36, either the output signal of selector 31 or that of reproducer 33 is switched in by a reproduction/non-reproduction mode control signal CTL2 output from microcomputer 60.

Furthermore, in second character combiner 37, the second character data generated from character signal generator 70 is combined with the video signal switched by second control switch 36, so as to be output to a monitor (not shown) and third character combiner 40. The output of second character combiner 37 is also provided to composite synchronous signal separator 38 which, in turn, separates a composite synchronous signal loaded onto the composite video signal from second character combiner 37, for subsequent output to synchronous signal separator 90. The second character data generated by character signal generator 70 is to be displayed onto a monitor and is data concerned with channel number, volume level and the like.

Third character combiner 40 combines the video signal output from second character combiner 37 and the third character data generated from character generator 70. The third character data is for display onto electronic viewfinder 80 and is data regarding, e.g., camcorder operating conditions, charge state, etc.

Figure 3:
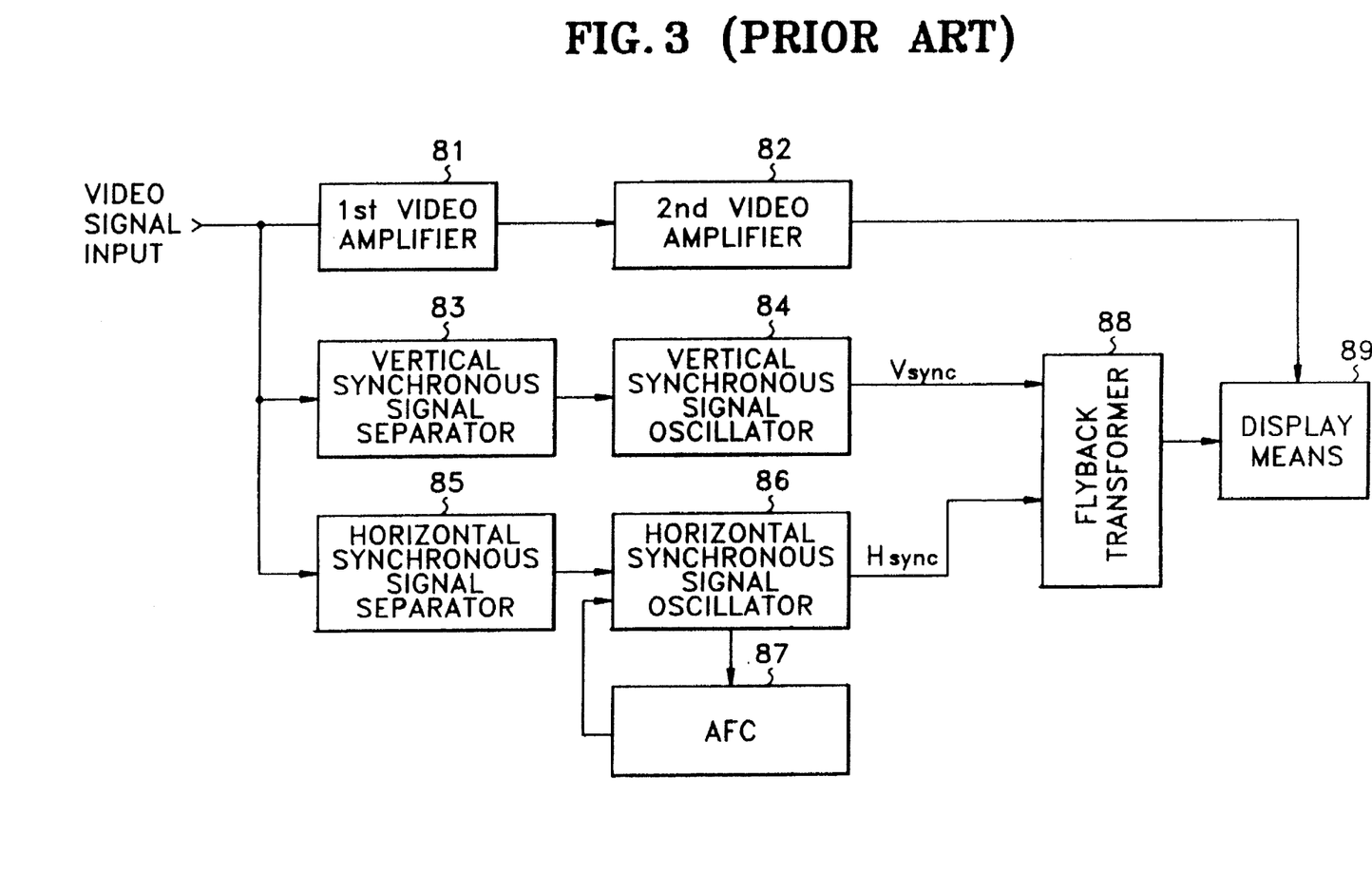
FIG. 3 is a detailed block diagram of the electronic viewfinder shown in FIG. 1.

In electronic viewfinder 80, as shown in FIG. 3, the video signal output from third character combiner 40 (FIG. 1) is displayed onto display means 89 through first and second amplifiers 81 and 82. At the same time, the vertical and horizontal synchronous signals loaded onto the composite video signal output from third character combiner 40 are separated in vertical and horizontal synchronous signal separators 83 and 85. Then, in vertical and horizontal synchronous signal oscillators 84 and 86, the respectively separated synchronous signals are input so as to generate the synchronous signals Vsync and Hsync having the proper frequency. Here, an automatic frequency controller (AFC) 87 is utilized in conjunction with horizontal synchronous signal oscillator 86, to provide a stable output. In accordance with the vertical synchronous signal (Vsync) and the horizontal synchronous signal (Hsync) output from the synchronous signal oscillators 84 and 86, the vertical and horizontal deflections of the display means 89 are controlled by a flyback transformer 88, so that the output of second video amplifier 82 can be displayed onto a correct location.

Character signal generator 70 shown in FIG. 1 generates first, second and third character data for first character combiner 20, which combines recording character data, for second character combiner 37, which combines OSD character data for monitor display, and for third character combiner 40, which combines OSD character data for electronic view finder 80, respectively, under the control of microcomputer 60. It will be noted that a synchronous signal is needed for displaying the above character data onto a screen. Accordingly, the vertical and horizontal synchronous signals are input to character signal generator 70, to thereby establish the location of the displayed character data.

Procedures for providing a synchronous signal to the conventional character signal generator 70 can be explained as follows, with respect to two types of video signal input conditions.

(1) Given that an external video signal or a camera video signal is input, the synchronous signal loaded onto a composite video signal output from second character combiner 37 is separated by synchronous signal separator 90 via composite synchronous signal separator 38. Thus, the horizontal and vertical synchronous signals are output to character signal generator 70.

(2) When an external video signal is not input but the selected mode is an external mode, the synchronous signal internally generated by synchronous signal generator 95 is input to synchronous signal separator 90. Synchronous signal generator 95 includes an oscillator for generating precise synchronous signals, which is typically a costly crystal oscillator. The input synchronous signal is divided into a vertical sync signal and a horizontal sync signal in synchronous signal separator 90, and are then output to character signal generator 70. When these horizontal and vertical synchronous signals are provided to character signal generator 70, the character signal is displayed onto a predetermined location of a monitor or electronic viewfinder 80, under the control of microcomputer 60 via the data output to character signal generator 70.

Since the conventional character display device as described above is constituted by synchronous signal separator 90 and synchronous signal generator 95 for supplying character signal generator 70 with needed synchronous signals when no external video signal is input, the overall cost of the camcorder cannot be reduced.

In addition, when the synchronous signal of synchronous signal generator 95 is divided into vertical and horizontal synchronous signals and supplied to character signal generator 70, the supplied synchronous signals are erratic. This disrupts and detracts from proper character data display. Although synchronous signal generator 95 generates a clean, steady synchronous signal, the input video signal has an imperfect horizontal synchronous signal and/or vertical synchronous signal because when a VCR-reproduced video signal is input, the horizontal and vertical synchronous signals loaded thereon may have been reproduced under such conditions as a poor video tape or irregular capstan motor operation. Accordingly, the composite video signal combining the video signal and the character data cannot be displayed on the correct location of the monitor or the electronic viewfinder. As a result, the displayed characters are not sharp.

SUMMARY OF THE INVENTION

To overcome the above-mentioned problems, the principal object of the present invention is to provide a character signal display for a camcorder which utilizes a synchronous signal supplied by a camera and viewfinder as a synchronous signal for displaying the character signal, when no external video signal is supplied.

Another object of the present invention is to provide a character signal display for a camcorder which provides a synchronous signal for displaying the character signal using an external video signal when an external video signal is input.

Still another object of the present invention is to provide a character signal display for a camcorder which utilizes a synchronous signal separated by a viewfinder when no video signal is input.

These and other objects, features and advantages according to the present invention are provided by a character signal display for a camcorder which selects the input camera video signal or an external video signal depending on a mode control signal so as to use the synchronous signal located on the selected signal for character display. Advantageously, the character signal display comprises:

a camera for converting optical information corresponding to a photographed object into an electrical signal and for combining the electrical signal with the synchronous signal generated by a synchronous signal generator associated with said camera so as to provide said camera video signal;

a viewfinder for displaying the character signal by employing the synchronous signal separated from one of said camera video signal and said external video signal applied via an external input terminal;

an external input detector for sensing whether the external video signal is applied to said external input terminal;

selection control means for controlling selection between the camera video signal or the external video signal responsive to mode control signal, and for preferentially controlling selection of the camera video signal when the external video signal is not input while the external mode is selected to thereby designate a selected video signal; and character signal generating means for generating the character signal at a predetermined location on the viewfinder by employing a first synchronous signal associated with the selected video signal and a second synchronous signal separated by the viewfinder.

BRIEF DESCRIPTION OF THE DRAWINGS

The above objects and advantages of the present invention will become more apparent by describing in detail a preferred embodiment thereof with reference to the attached drawings in which like or similar numbers denote like or similar elements and in which.

DETAILED DESCRIPTION OF THE PREFERRED EMBODIMENTS

The present invention will be explained in more detail with reference to the attached drawings.

Figure 4A:
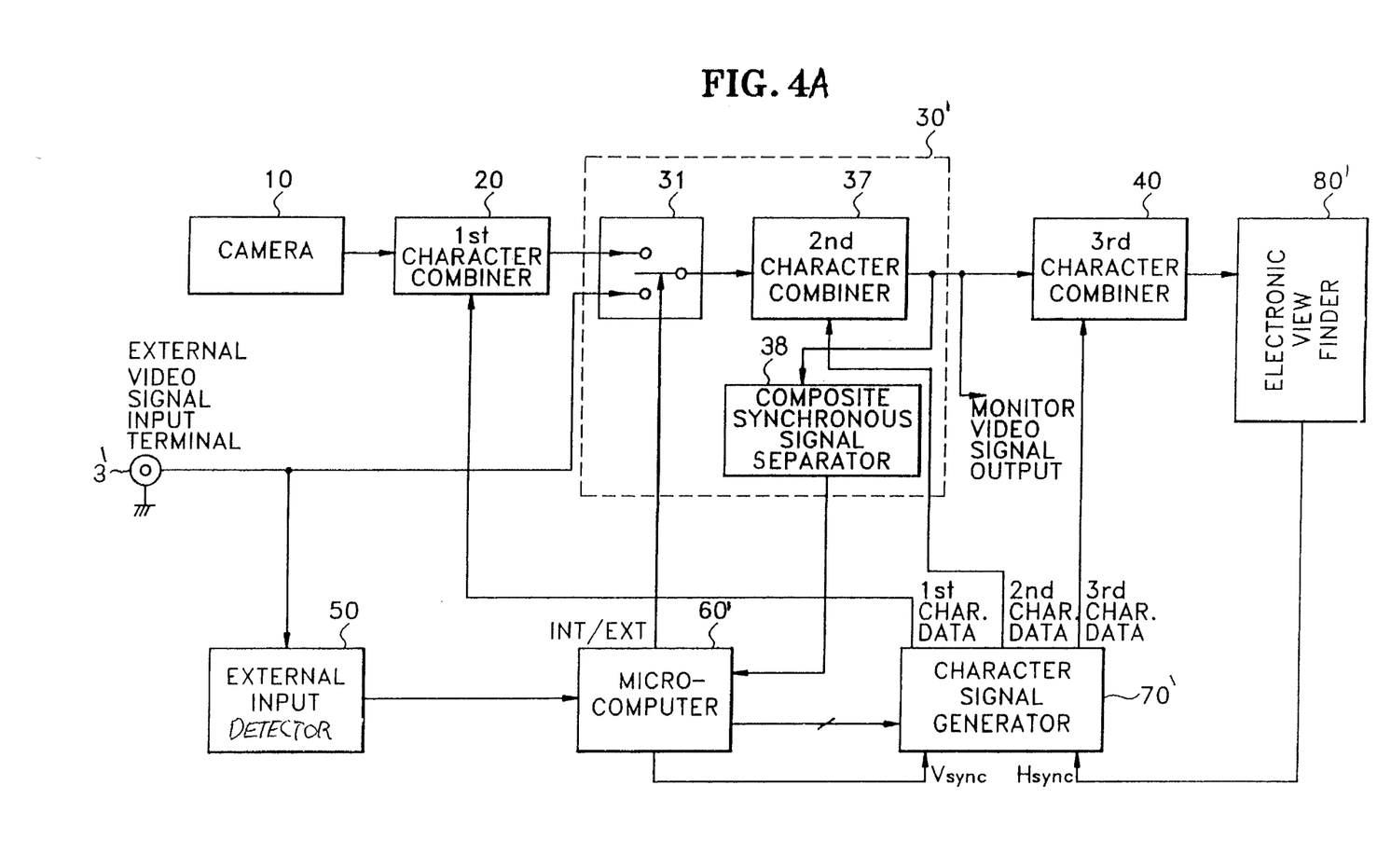
FIG. 4A and FIG. 4B are high and low level block diagrams, respectively, showing a preferred embodiment of a character signal display for a camcorder according to the present invention.

FIG. 4A is a high level block diagram showing essential elements of an embodiment of a character signal display for a camcorder according to the present invention. Preferably, components which are the same as those in FIG. 1 have the same or similar reference numerals. A detailed explanation for these common elements, since previously explained with respect to FIG. 1, will be omitted. It will be also appreciated the elements included in, e.g., unit 30' which form no part of the present invention, are omitted from FIG. 4A (and FIG. 7A as well).

Figure 4B:
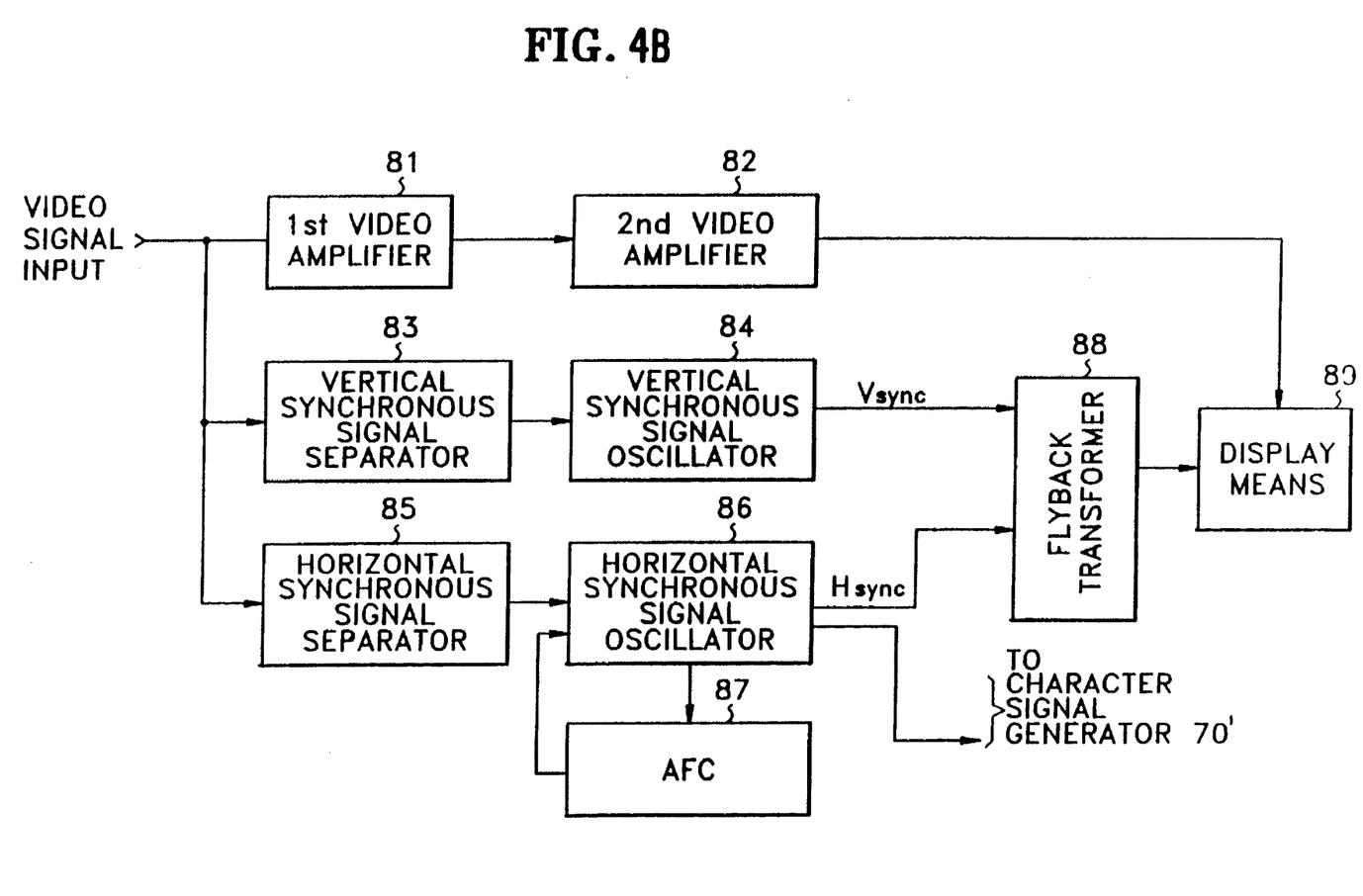

Referring to FIG. 4A, in contrast with FIG. 1, the synchronous signal generator 90 and synchronous signal separator 95 for supplying vertical and horizontal synchronous signals to the character signal generator 70 are removed. Then, the output of composite synchronous signal separator 38 which belongs to recorder/reproducer unit 30' is connected to microcomputer 60' in which a vertical synchronous signal output therefrom is connected to character signal generator 70'. Also, the horizontal synchronous signal output of the horizontal synchronous signal oscillator 86' of electronic viewfinder 80', as shown in FIG. 4B, is connected to character signal generator 70'.

As will be appreciated from a comparison of FIG. 1 with FIG. 4A, the circuit of FIG. 4A includes an external input detector 50 connected between external video signal input terminal 3' and microcomputer 60', for sensing whether an external video signal is being input.

The procedure for supplying the horizontal and vertical synchronous signals to character signal generator 70' can be explained as follows.

Referring to FIG. 4A, the image introduced via the lens of camera 10 is output as a camera video signal, which preferably is a composite video signal in which the video image signal and the synchronous signal are combined. The synchronous signal is generated by a synchronous signal generator, e.g., generator 16a, within camera 10. Furthermore, electronic viewfinder 80' includes oscillators 84 and 86' to supply the synchronous signal, as shown in FIG. 4B. Accordingly, the horizontal synchronous signal output from oscillator 86' is used so as to display the video signal correctly in electronic viewfinder 80'. Preferably, electronic viewfinder 80' internally produces the synchronous signal by a method in which the frequency of the synchronous signal is controlled automatically, i.e., by comparison of the synchronous signal from an output video signal and the synchronous signal produced therein. Thus, the correct synchronous signal can be obtained.

As described above, an embodiment constituted to obtain the synchronous signal for displaying the character data by employing the synchronous signal generated by camera 10 and electronic viewfinder 80', which require oscillators as essential components, is shown in FIG. 4A.

Now, the two conditions for video signal input will be described.

(a) If an external video signal input is detected, that is, if the external video signal input at external video signal input terminal 3' is input to external input detector 50 and simultaneously to selector 31 of recorder/reproducer unit 30', a signal indicating the presence of an external input is provided to microcomputer 60' from the external input detector 50.

The operation of external input detector 50 which advantageously can be used to generate an external input detection signal will be explained below in detail while referring to FIG. 5.

When the external input detection signal for indicating the input of the external video signal is input from external input detector 50 to microcomputer 60', an input selection signal for selecting an external video signal is output to selector 31 by microcomputer 60'. Thus, when an external video signal is selected by selector 31, the operation (as explained with reference to FIG. 1) of recorder/reproducer unit 30 is performed. In composite synchronous signal separator 38, a composite synchronous signal is separated from the composite video signal output from second character combiner 37, and the separated composite synchronous signal is input to microcomputer 60'. Then, the vertical synchronous signal is separated from the input composite synchronous signal and supplied to character signal generator 70'.

Advantageously, the vertical synchronous signal is separated in microcomputer 60' because the microcomputer can precisely correct the frequency of the vertical synchronous signal before output to generator 70'. It will be appreciated that the construction of microcomputer 60' is complicated when the horizontal synchronous signal is to be concurrently separated after the composite synchronous signal is input to microcomputer 60'. Furthermore, the manufacturing cost of such a device is quite expensive.

Meanwhile, in second character combiner 37, the second character data output from character signal generator 70' is combined with the external video signal, and the combined video signal can be output to a monitor. The monitor-supplied video signal and the third character data generated by character signal generator 70' are combined in third character combiner 40 so as to be output to electronic viewfinder 80'. At this time, in electronic viewfinder 80', a horizontal synchronous signal is separated from the video signal output from third character combiner 40 and provided to character signal generator 70'. In electronic view finder 80', the synchronous signal is preferably loaded onto the video signal and the synchronous signal generated by the oscillator in electronic viewfinder 80' are compared so as to correct the phase and frequency precisely, thereby enabling the character data to be displayed in the correct location.

In addition, even though there is a video signal, when the synchronous signal cannot be separated due to noise, the synchronous signal Hsync is generated based on the synchronous signal previously separated from the video signal by automatic frequency controller 87 shown in FIG. 4B. Thus, the synchronous signal having the phase and frequency suitable for displaying the character data is supplied to character signal generator 70'.

As described above, the vertical and horizontal synchronous signals separated from an external video signal are supplied to character signal generator 70' when there is an external input video signal present. It will be appreciated that, for the case of a camera video input, selector 31 selects the output of first character combiner 20 so as to perform the same operation described above.

(b) With no external video signal applied via external video signal input terminal 3', a non-detection signal, indicating that there is no external video signal input, is output by external input detector 50. When the non-detection signal is input to microcomputer 60', the appropriate input selection signal is output to selector 31 by microcomputer 60'. Then, microcomputer 60' controls selector 31. so that the camera video signal can be selected.

As described above, the camera video signal is combined with the synchronous signal produced in camera 10. Moreover, within the camera video signal selected by selector 31, the character data for recording is combined to the camera video signal output from camera 10 by first character combiner 20. The output of first character combiner 20 is input to composite synchronous signal separator 38 via second character combiner 37. The composite synchronous signal is separated from the composite video signal in composite synchronous signal separator 38 so as to be output to microcomputer 60', wherein the vertical synchronous signal is separated from the input composite synchronous signal so as to be supplied to character signal generator 70'. This procedure is the same as that of example (a) above.

In addition, an output of second character combiner 37 is output to a monitor (not shown) and to third character combiner 40, the output of which is input to electronic viewfinder 80'. Preferably, the horizontal synchronous signal generated Hsync from horizontal synchronous oscillator 86' within the electronic viewfinder 80' (FIG. 4B) is output to character signal generator 70', similar to the case where the external video signal is input.

To summarize, when no external video signal is input, a camera video signal output from camera 10 is selected and input by selector 31. Then, the vertical synchronous signal is supplied to character signal generator 70' by employing the synchronous signal separated from the camera video signal, while the horizontal synchronous signal output from electronic viewfinder 80' is supplied to character signal generator 70'.

Figure 5:
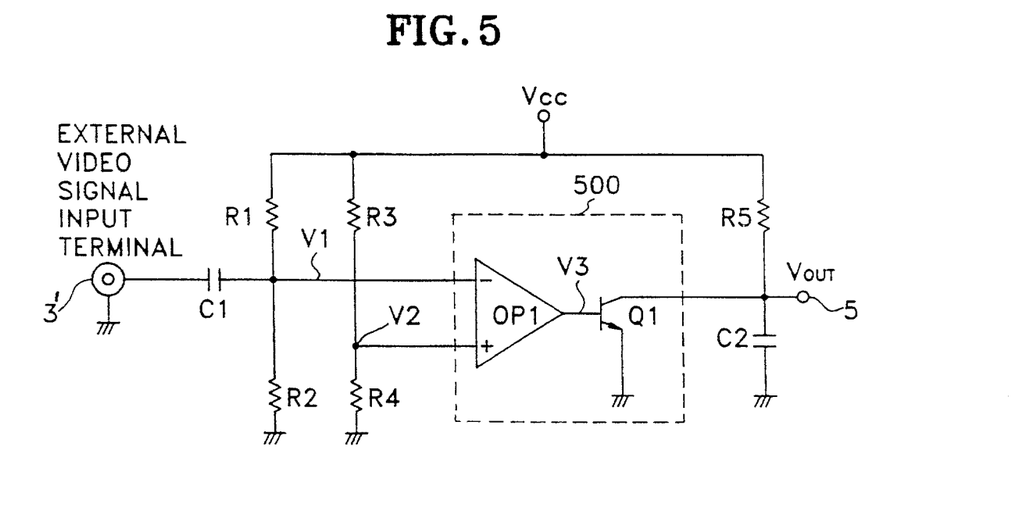
FIG. 5 is a detailed circuit diagram showing the external input detector shown in FIG. 4.

FIG. 5 is a detailed circuit diagram showing the external input detector 50 shown in FIG. 4A, which advantageously can be constructed as follows.

Referring to FIG. 5, a voltage comparator 500 includes an operational amplifier OP1 and a transistor Q1. The base of Q1 is connected to the output of operational amplifier OP1 and while the emitter is grounded, thus providing an "open collector" configuration. Resistors R1 & R2 and R3 & R4 are serially connected to power voltage Vcc input terminal, with resistors R2 and R4 each being grounded. The common node between resistors R1 and R2 is connected to the inverting input of operational amplifier OP1, while the common node between resistors R3 and R4 is connected to the non-inverting input of operational amplifier OP1. External video signal input terminal 3' is connected to one end of a capacitor C1 whose other end is connected to the common node between resistors R1 and R2. A resistor R5 and a capacitor C2 are serially connected to power voltage Vcc input terminal, with capacitor C2 being grounded. The collector of transistor Q1 is connected to the common node between resistor R5 and capacitor C2, where an output terminal 5 delivers an external input detection signal Vout.

Figure 6A:
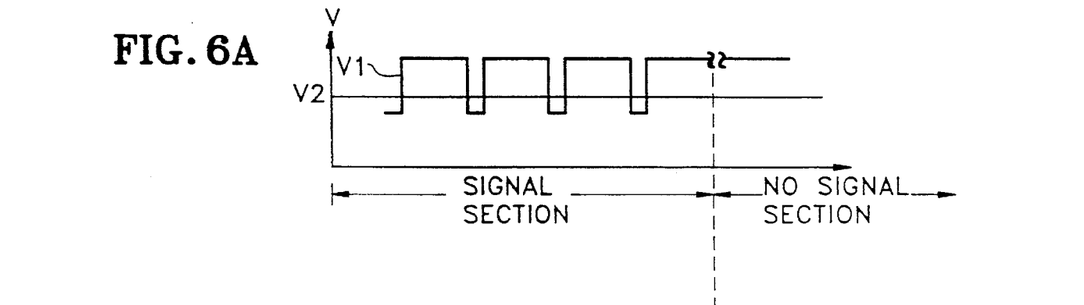
FIG. 6A through FIG. 6C are waveforms for explaining the external input detector shown in FIG. 5.
Figure 6B:
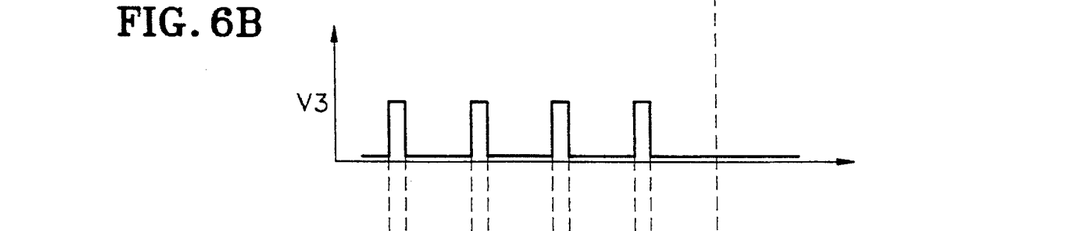
Figure 6C:
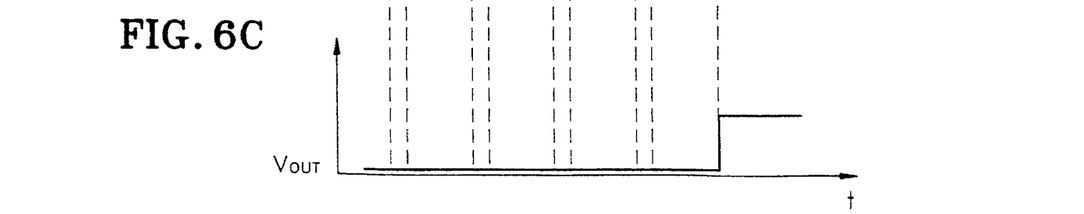

FIG. 6A to FIG. 6C are waveform diagrams showing the operation of the external input detector 50 shown in FIG. 5. Here, "V1" is an external video signal applied to the inverting input of operational amplifier OP1, "V2" is a reference voltage of voltage comparator 500 applied at the non-inverting input of operational amplifier OP1, "V3" is the output signal of voltage comparator 500, and "Vout" is an external input detection signal.

The operation of the thus-structured external signal detector 50 will now be explained with reference to FIG. 6A to FIG. 6C.

An external video signal V1 is not applied to the inverting input of operational amplifier OP1 when there is no external input video signal (the "no signal section" shown in FIG. 6A), i.e., a video signal including a synchronous signal does not exist in the camcorder, making it impossible to maintain a pedestal level. Since the potential of the pedestal level is higher than reference voltage V2 of voltage comparator 500, output signal V3 of operational amplifier OP1 is inverted and output as a "low" signal (the "no signal section" of FIG. 6B). Accordingly, transistor Q1 having a "low" signal applied to its base is turned off. The power voltage (Vcc) is output via resistor R5 and output terminal 5. As a result, external input detection signal Vout goes "high" (the "no signal section" of FIG. 6C).

However, when an external video signal is input (the "signal section" shown in FIG. 6A), external video signal V1 is applied. Therefore, the section having the electric potential lower than reference voltage V2 of voltage comparator 500 exists in the synchronous signal section. Then, the input external video signal V1 is compared with reference voltage V2 of voltage comparator 500, and the synchronous signal section having a level lower than reference voltage V2 is inversely amplified into a "high" state and output as output signal V3 (the "signal section" of FIG. 6B). At this time, transistor Q1 is turned on during the "high" intervals shown in FIG. 6B so that the power voltage Vcc is discharged by shunt to ground via resistor R5. During the "low" intervals in the "signal section" of FIG. 6B, transistor Q1 is preferably turned off so that power voltage Vcc is used in charging capacitor C2. However, the power voltage Vcc is discharged by shunt to ground during the ON state of transistor Q1, i.e., during the "high" intervals in the "signal section" of FIG. 6B. Accordingly, capacitor C2 is advantageously not charged to a level recognized as a "high." A logic "low" external input detection signal Vout is output (the "signal section" of FIG. 6C).

Thus, an external input detection signal is output according to the operation of external input detector 50. Then, microcomputer 60' outputs an input selection control signal to selector 31 according to the external input detection signal, so as to select the camera video signal or external video signal.

Figure 7A:
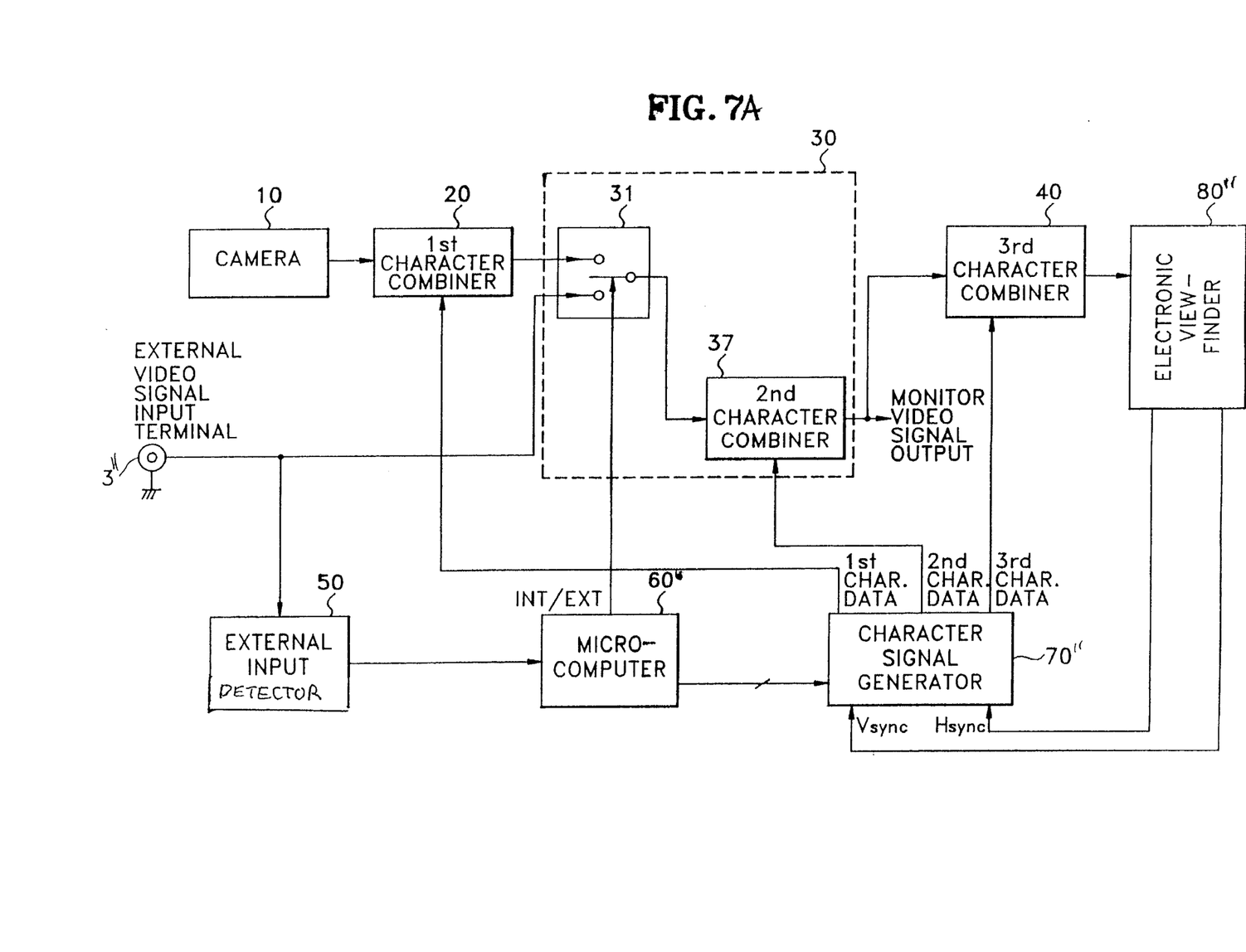
FIG. 7A and FIG. 7B are high and low level block diagrams, respectively, showing another preferred embodiment of a character signal display for a camcorder according to the present invention.

FIG. 7A is a block diagram showing another embodiment of the character signal display for a camcorder according to the present invention. Here, components which are the same as those in FIG. 4A have similar reference numerals, and explanation thereof will be omitted.

Figure 7B:
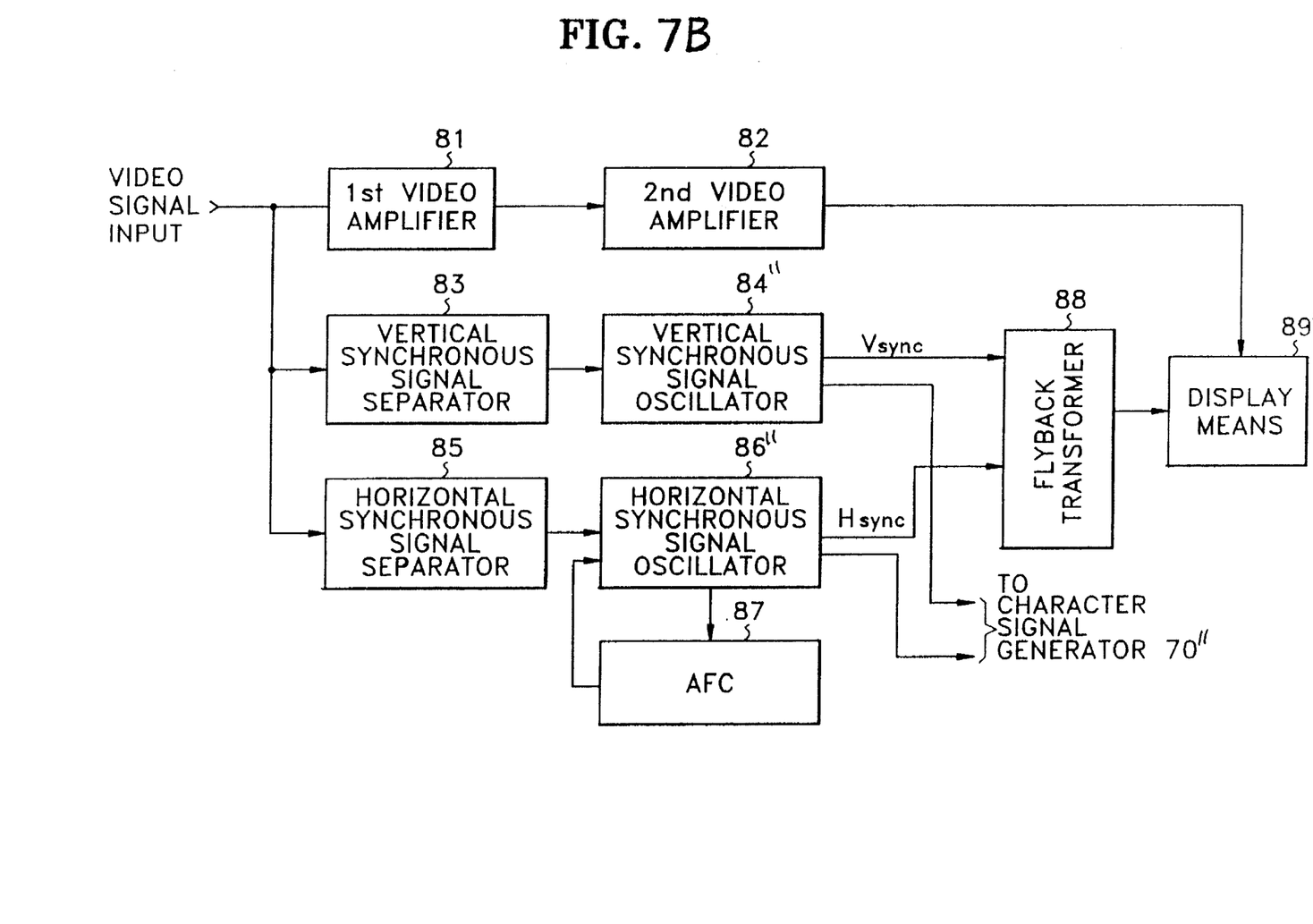

Referring back to FIG. 4A, the source of the vertical synchronous signal for generating the character data, when an external video signal is not input, is selected as the composite video signal generated by camera 10 using selector 31. The synchronous signal advantageously can be separated from the selected camera video signal. Then, a vertical synchronous signal is separated from the synchronous signal by microcomputer 60' and output to character signal generator 70'. In contrast, in the circuit of FIG. 7A, the horizontal and vertical synchronous signal inputs of character signal generator 70" are connected to the horizontal and vertical synchronous oscillators 84" and 86" within electronic viewfinder 80" as shown in FIG. 7B. Thus, the character display location is controlled by employing the horizontal and vertical synchronous signals generated by electronic viewfinder 80".

It will be appreciated that the present invention can be adopted to any device for camcorder character display.

In the character signal display for a camcorder according to the present invention, the horizontal and/or vertical synchronous signals generated from a camera and a viewfinder are utilized without using an additional synchronous signal separator and synchronous signal generator. As a result, the manufacturing cost can be reduced, even while the character data can still be exactly displayed on the monitor/viewfinder.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A character signal display for a camcorder which selects an input camera video signal or an external video signal in response to a mode control signal so as to use a synchronous signal loaded onto a selected signal for character display, said character signal display comprising:

a camera for converting optical information corresponding to a photographed object into an electrical signal and for combining said electrical signal with an input synchronous signal generated by a synchronous signal generator associated with said camera to provide the camera video signal;

a viewfinder for displaying a character signal by employing a composite synchronous signal separated from said camera video signal or from said external video signal applied via an external input terminal;

external input detecting means for sensing whether said external video signal is input to said external input terminal;

selection control means for selectively controlling output of said camera video signal or said external video signal in accordance with the mode control signal, while selecting said camera video signal when said external video signal is not input to thereby output said selected signal; and character signal generating means for generating said character signal for display at a predetermined location on said viewfinder by employing the composite synchronous signal loaded onto said selected signal and another composite synchronous signal separated by said viewfinder.

2. A character signal display for a camcorder comprising:

a camera for converting optical information of a photographed object into an electrical signal and for combining said electrical signal with a generated synchronous signal generated by a synchronous signal generator associated with said camera to thereby provide a camera video signal;

a viewfinder for displaying character signal data by employing horizontal and vertical synchronous signals separated from said camera video signal;

external input detection means for sensing whether an external video signal is input via an external input terminal;

selection means for selecting one of said camera video signal and said external video signal responsive to a mode control signal, and for selecting said camera video signal when said the external video signal is not applied to said external input terminal to thereby provide a selected signal;

a microcomputer for separating a vertical synchronous signal from a composite synchronous signal included in said selected signal, and for outputting a selection control signal for selecting said one of said camera video signal and said external video signal depending on the mode control signal to said selection means;

character signal generating means for generating said character signal data corresponding to a predetermined location on said viewfinder, based on said vertical and said horizontal synchronous signals respectively supplied from said microcomputer and said viewfinder; and character signal combining means for combining said character signal data generated by said character signal generating means with said selected signal.

3. The character signal display for a camcorder according to claim 2, wherein said viewfinder comprises an automatic frequency control AFC circuit so that said horizontal synchronous signal separated from the composite synchronous signal loaded onto said selected signal can be controlled so as to have a correct horizontal period.

4. The character signal display for a camcorder according to claim 2, wherein said character signal combining means comprises:

first character combining means for combining recording data generated by said character signal generating means and said camera video signal output from said camera;

second character combining means for combining external-display data generated by said character signal generating means and said selected signal to thereby provide a combined selected signal; and third character combining means for combining viewfinder-display data generated by said character signal generating means and said combined selected signal.

5. The character signal display for a camcorder according to claim 2, wherein said external input detection means comprises:

a comparator for comparing a direct current level of said external video signal input to said external input terminal and a reference signal level; and switching means for outputting a switching signal as an external input detection signal to said microcomputer according to the comparison result of said comparator.

6. A character signal display for a camcorder which selects one of an camera video signal and external video signal depending on a mode control signal so as to use a composite synchronous signal loaded onto a selected signal for character display, said character signal display comprising:

external input detection means for sensing whether the external video signal is input to an external input terminal;

selection control means for selectively controlling output of said camera video signal and said external video signal in accordance with said mode control signal, while selecting said camera video signal when the external video signal is not input to thereby provide said selected signal;

a viewfinder for displaying a character signal by employing said composite synchronous signal separated from said selected signal; and character signal generating means for generating a character signal at a predetermined location on said viewfinder by employing said composite synchronous signal separated by said viewfinder.

7. A character signal display for a camcorder having a camera for converting optical information corresponding to a photographed object into an electrical signal and a viewfinder for displaying a character signal responsive to vertical and horizontal synchronous signals separated from a video signal corresponding to said electrical signal output via said camera as a camera video signal, said character signal display comprising:

said viewfinder;

external signal input detection means for detecting whether or not an external video signal is applied to an external input terminal;

selecting means for performing selection between said camera video signal and said external video signal so as to output said camera video signal when said external video signal is not input, wherein one of said camera video signal and said external video signal is output as a selected video signal in accordance with a mode control signal;

character signal generating means for generating the character signal at a predetermined location on said viewfinder by employing said vertical and said horizontal synchronous signals separated in said viewfinder when said external video signal is not input; and character signal combining means for combining said character signal generated by said character signal generating means with said selected video signal.

8. The character signal display for a camcorder according to claim 7, wherein said viewfinder comprises an automatic frequency control (AFC) circuit whereby said horizontal synchronous signal separated from a composite synchronous signal loaded onto said selected signal can be controlled so as to have a predetermined horizontal period.

9. The character signal display for a camcorder according to claim 7, wherein said character signal combining means comprises:

first character combining means for combining recording data generated by said character signal generating means and said camera video signal;

second character combining means for combining external display data generated by said character signal generating means and said selected video signal; and third character combining means for combining viewfinder-display data generated by said character signal generating means and the respective output of said second character combining means.

10. The character signal display for a camcorder according to claim 7, wherein said detection means comprises:

a comparator for comparing a direct current level of said external video signal input to said external input terminal with a reference signal level; and switching means for outputting a switching signal as an input detection signal to a microcomputer according to the comparison result of said comparator.

11. An improvement for a character signal display for a camcorder having a camera for generating a camera video signal and a viewfinder for displaying a character signal applied to one of first, second and third character combining circuits serially connecting said camera to said viewfinder, said character signal being supplied from a means for generating the character signal, wherein the generating means is responsive to applied horizontal and vertical synchronizing signals, said improvement comprising:

first signal generating means for generating said vertical synchronizing signal responsive to a composite video signal, corresponding to a selected one of said camera video signal and an external video signal, provided downstream of said second character combining circuit; and second signal generating means for generating said horizontal synchronizing signal responsive to said composite video signal provided downstream of said third character combining circuit.

12. The improved character signal display for a camcorder according to claim 11, wherein said second signal generating means comprises an automatic frequency control (AFC) circuit whereby said horizontal synchronizing signal separated from a composite synchronizing signal included in said composite video signal can be controlled so as to have a predetermined horizontal period.

13. The improved character signal display for a camcorder according to claim 11, wherein said first signal generating means comprises:

a separating circuit for separating a composite synchronizing signal from said composite video signal; and computer means for separating said vertical synchronizing signal from a received said composite synchronizing signal.

14. The improved character signal display for a camcorder according to claim 11, wherein said first signal generating means and said second signal generating means are both responsive to said composite video signal provided downstream of said third character combining circuit.

* * * * *